US008230797B2

(12) United States Patent
Chan et al.

(10) Patent No.: US 8,230,797 B2
(45) Date of Patent: Jul. 31, 2012

(54) CORROSION RESISTANT COATINGS SUITABLE FOR ELEVATED TEMPERATURE APPLICATION

(75) Inventors: Kwai S. Chan, San Antonio, TX (US); Narayana Sastry Cheruvu, San Antonio, TX (US); Wuwei Liang, Austin, TX (US)

(73) Assignee: Southwest Research Institute, San Antonio, TX (US)

( * ) Notice: Subject to any disclaimer, the term of this patent is extended or adjusted under 35 U.S.C. 154(b) by 853 days.

(21) Appl. No.: 12/325,836

(22) Filed: Dec. 1, 2008

(65) Prior Publication Data

US 2010/0132598 A1 Jun. 3, 2010

(51) Int. Cl.
*F23M 5/00* (2006.01)
*C22C 30/00* (2006.01)
(52) U.S. Cl. .................... 110/336; 420/584.1
(58) Field of Classification Search .............. 110/336; 420/584.1; 427/96.2
See application file for complete search history.

(56) References Cited

U.S. PATENT DOCUMENTS 4,671,931 A 6/1987 Herchenroeder et al.
6,866,886 B2 3/2005 Knowles et al.

OTHER PUBLICATIONS

Bakker, "Materials Solutions for Waterwall Wastage—An Update," EPRI, Palo Alto, CA, 2005, Report #1009618.
Banfield, EPRI Report 1000186, "Long-Term Testing of Protective Coatings and Claddings at Allegheny Energy Supply Hatfield's Ferry #2 Boiler," EPRI, Palo Alto, CA, 2000, Report #1000186.
Verstak, et al., "Composite Coatings for Elevated Temperature Erosion-Corrosion Protection in Fossil-Fueled Boilers," Corrosion 98, Paper 193.
Wang, "The Effect of Nanocrystallization on the Selective Oxidation and Adhesion of Al2O3 Scales," Oxidation of Metals, vol. 48 (1997) 215-223.
Liu, et al., "Oxidation Behaviour of Sputter Deposited Ni-Cr-Al Micro-Crystalline Coatings," Acta Mater., vol. 46 (1998) 1691-1700.
Liu, et al., "Oxidation Behaviours of Microcrystalline Ni-Cr-Al Alloy Coatings at 900° C.," Scripta Mater., vol. 38 (1998) 877-885.
Chen, et al., "The Effect of Nanocrystallization on the Oxidation Resistance of Ni-5Cr-5Al Alloy," Scripta. Mater., vol. 41 (1999) 883-887.
Chen, et al., "Oxidation Behavior of Sputtered Ni-3Cr-20 Al Nanocrystalline Coating," Mater. Sci. Eng. A, vol. A271 (1999) 360-365.
Liu, et al., "Improved Oxide Spallation Resistance of Microcrystalline Ni-Cr-Al Coatings," Oxidation of Metals., vol. 50 (1998) 51-69.
Chen, et al., "Oxidation Behavior of Sputtered Ni-Cr-Al-Ti Nanocrystalline Coating," Surf. Coat. Technol., vol. 123 (2000) 92-96.
Chen, et al., "Effect of Nanocrystallization on the Oxidation Behavior of a Ni-8Cr-3.5 Al Alloy," Oxidation of Metals, vol. 54 (2000) 155-162.
Ajdelsztajn, et al., "Synthesis and Oxidation Behavior of Nanocrystalline MCrAlY Bond Coatings," J. Thermal Spray Technol., vol. 14 (2005) 23-30.

(Continued)

*Primary Examiner* — Jessica L Ward
*Assistant Examiner* — Alexander Polyansky
(74) *Attorney, Agent, or Firm* — Grossman Tucker et al

(57) ABSTRACT

The present invention relates to corrosion resistance coatings suitable for elevated temperature applications, which employ compositions of iron (Fe), chromium (Cr), nickel (Ni) and/or aluminum (Al). The compositions may be configured to regulate the diffusion of metals between a coating and a substrate, which may then influence coating performance, via the formation of an inter-diffusion barrier layer. The inter-diffusion barrier layer may comprise a face-centered cubic phase.

15 Claims, 11 Drawing Sheets

OTHER PUBLICATIONS

Cheruvu, "Nanostructured Coatings by Pulsed Plasma Processing for Alloys used in Coal-fired Environments," Department of Energy, Small Business Technology Transfer (STTR) Program, DE-FG02-5ER 86249, SwRl 4th Quarterly Report to Karla Technologies, Feb. 2008.

Liu, et al., "Oxidation Behaviour of Nanocrystalline Fe-Ni-Cr-Al Alloy Coatings," Materials Science and Technology, vol. 15 (1999) 1447-1450.

He, et al., "Micro-crystalline Fe-Cr-Ni-Al-Y2O3 ODS Alloy Coatings Produced by High Frequency Electric-Spark Deposition," Materials Science and Engineering, vol. A334 (2002) 179-186.

A. B. Thermo-Calc Software, DICTRA, Version 24, Thermo-Calc Software AB, Stockholm, 2007.

Liu et al., "Cyclic Oxidation of Sputter-Deposited Nanocrystalline Fe-Cr-Ni-Al Alloy Coatings," Oxidation of Metals, vol. 51 (1999) 403-419.

Thermo-Calc Software, "Welcome to Thermo-Calc Software," available at http://www.thermocalc.com/; retrieved on Oct. 10, 2008.

Thermo-Calc Software, "Dictra," available at http://www.thermocalc.com/Products/Dictra.html; retrieved on Oct. 10, 2008.

Mineral Help, "Unit Cell Dimensions," available at http://webmineral.com/help/CellDimensions.shtml; retrieved on Oct. 24, 2008.

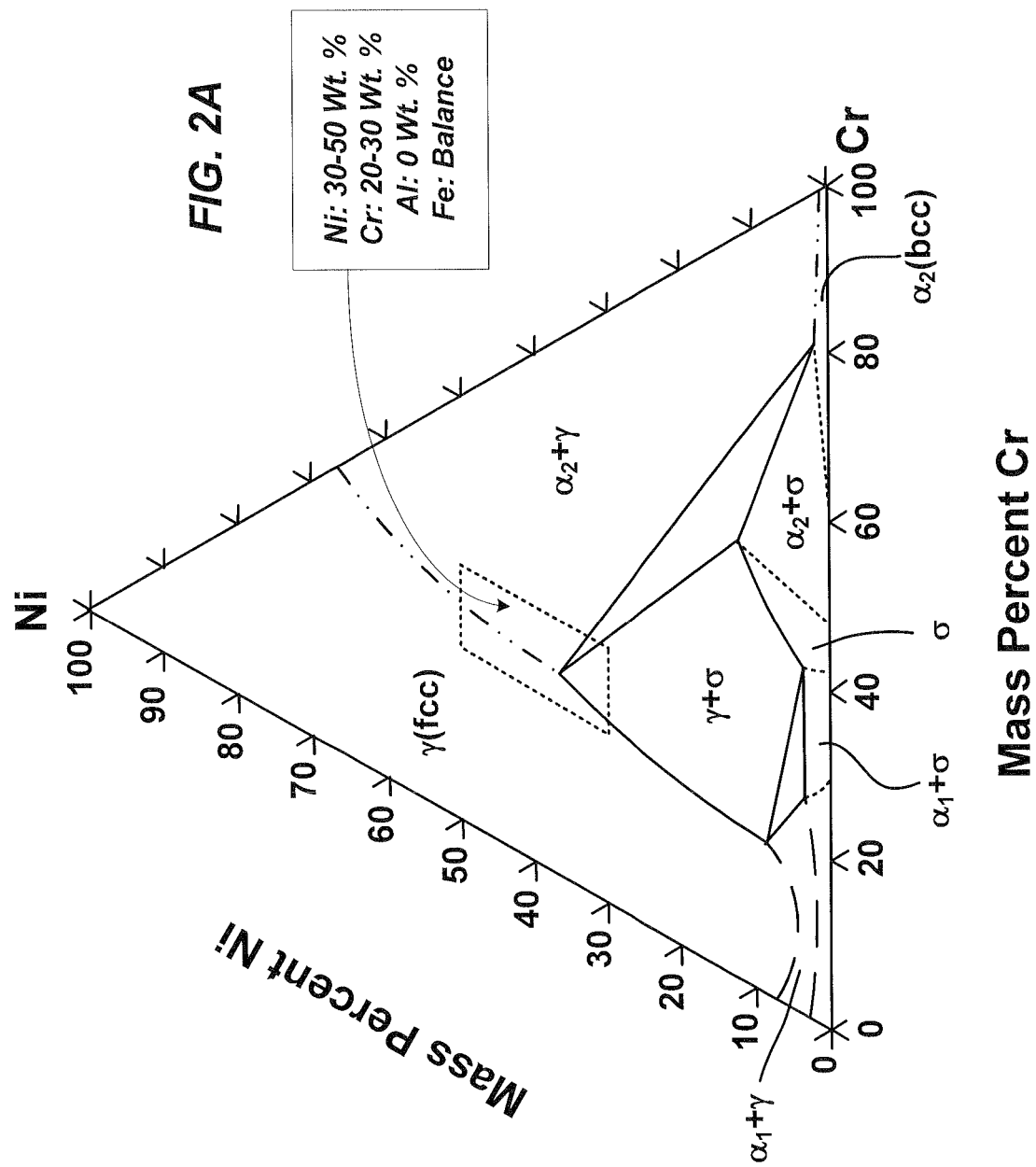

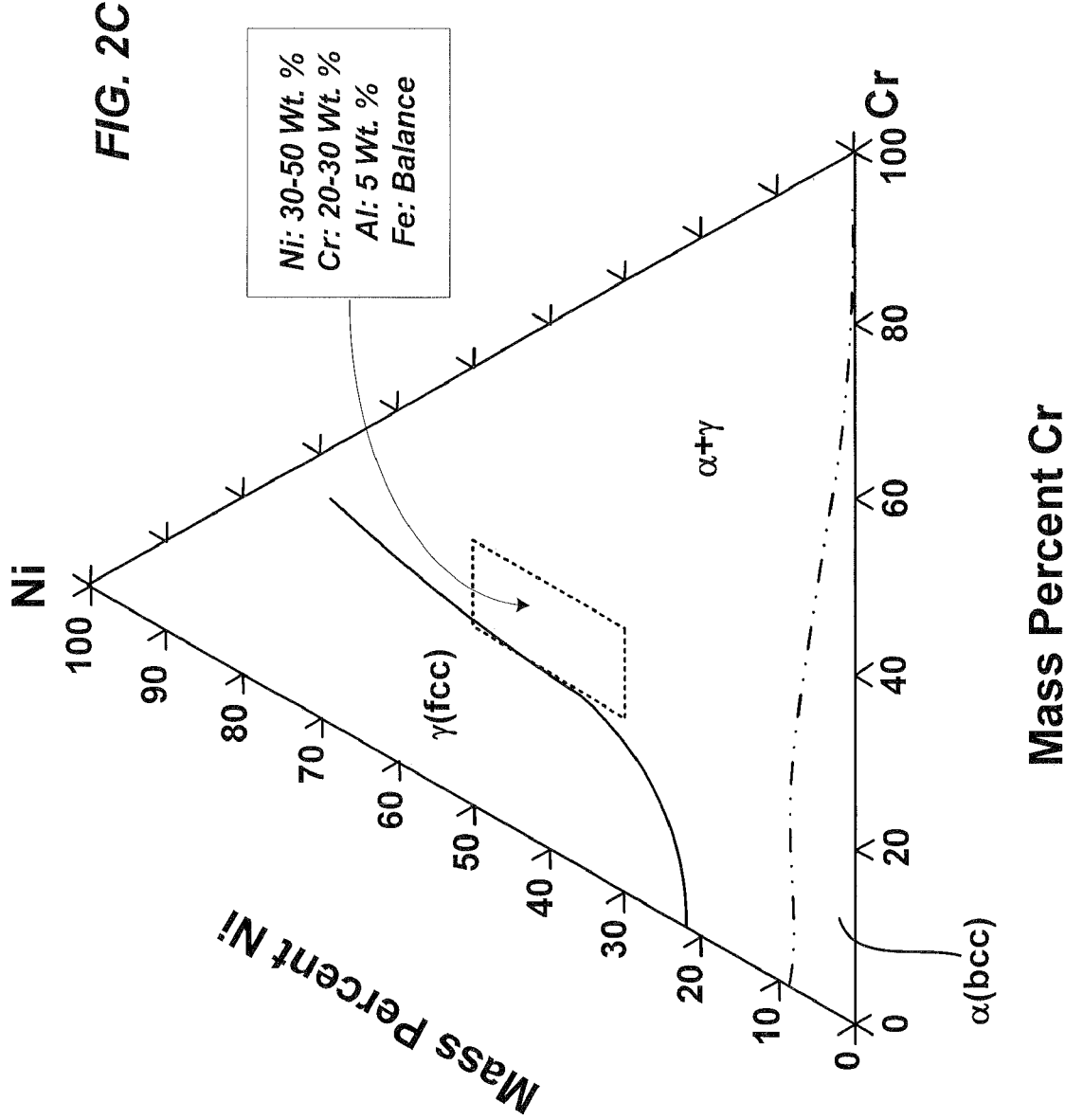

CORROSION RESISTANT COATINGS SUITABLE FOR ELEVATED TEMPERATURE APPLICATION

STATEMENT REGARDING FEDERALLY SPONSORED RESEARCH OR DEVELOPMENT

This invention was made with United States Government support under Contract No. DE-FC26-07NT43096 awarded by the United States Department of Energy. The Government has certain rights in this invention.

FIELD OF THE INVENTION

The present invention relates to corrosion resistant coatings suitable for elevated temperature applications, which employ compositions of iron (Fe), chromium (Cr), nickel (Ni) and/or aluminum (Al). The compositions may be configured to regulate the diffusion of metals between a coating and a substrate, which may then influence coating performance. More specifically, the compositions may be configured to specifically develop diffusion barrier layers at a coating-substrate interface, which barrier layers may include a face centered-cubic phase with respect to the indicated metallic elements.

BACKGROUND OF THE INVENTION

Coal-fired power plants currently account for more than 55 percent of the total electricity production in the United States. Extending the reliable lifetimes of fossil-fired boiler components may be considered important for reducing the maintenance cost and improving power plant operational efficiency. Currently, corrosion and erosion are leading causes of superheater and reheater boiler tube failures, which can result in costly, unscheduled outages. Several coatings and weld overlays have been used to extend the service life of boiler tubes.

Greater efficiency can be achieved in fossil-fired power plants by increasing the steam temperature and pressure into the Ultra Super Critical (USC) conditions (760° C. and 35 MPa). The USC conditions, however, promote coal ash corrosion and increase corrosion rates. In order to improve the reliability and availability of fossil-fired USC boilers, new coatings are needed to provide enhanced corrosion and erosion resistance without adversely affecting mechanical performance of the component materials.

SUMMARY

In a first exemplary embodiment, the present disclosure is directed at a method of forming an inter-diffusion resistant matrix in an alloy coating positioned on a substrate comprising supplying a coating composition having the formula:

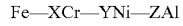

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent. This may then be followed by applying the coating composition to a substrate and forming a face-centered-cubic (fcc) phase identified by the presence of a face-centered cubic unit cell in Space Group 225, wherein the value of $a_1$ and $a_2$ is about 0.36 nm and the value of $a_3$ is also about 0.36 nm wherein the fcc phase comprises 20-25 weight percent Cr, 30-50 weight percent Ni, and the remainders are Fe and Al.

In a second exemplary embodiment, the present disclosure relates to a method of forming an inter-diffusion barrier layer between an alloy coating positioned on a substrate comprising supplying a coating composition having the formula

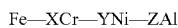

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent. This may then be followed by applying the coating composition to a substrate and forming a face-centered-cubic (fcc) phase identified by the presence of a face-centered cubic unit cell in Space Group 225 wherein the values of $a_1$ and $a_2$ are about 0.36 nm and the value of $a_3$ is also about 0.36 nm wherein the fcc phase comprises 20-25 weight percent Cr, 30-50 weight percent Ni, and the remainders are Fe and Al. The coating may contain 90 mole percent of the fcc phase as well as up to 10 mole percent of a body-centered cubic (bcc) phase identified by the presence of a body-centered cubic unit cell in Space Group 229 wherein the values of $a_1$ and $a_2$ are about 0.29 nm and the value of $a_3$ is about 0.29 nm.

In a third exemplary embodiment, the present disclosure relates to a coating composition of a metallic alloy which forms a face-centered cubic (fcc) phase at the interface of said coating with a selected substrate, comprising:

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent. The face-centered-cubic (fcc) phase is identified by the presence of a cubic unit cell, wherein the values of $a_1$ and $a_2$ are about 0.36 nm and the value of $a_3$ is also about 0.36 nm and wherein the fcc phase comprises 20-25 weight percent Cr, 30-50 weight percent Ni, and the remainders are Fe and Al.

In a further exemplary embodiment, the present disclosure is also directed at a fossil fired power generating boiler, having a surface that is exposed to the burning of a fossil fuel wherein the surface includes a coating composition of a metallic alloy which forms a face-centered cubic (fcc) phase at the interface of said coating with a selected substrate, comprising:

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent. The face-centered-cubic (fcc) phase may be identified by the presence of a cubic unit cell, wherein the values of $a_1$ and $a_2$ are about 0.36 nm and the value of $a_3$ is about 0.36 nm and wherein the fcc phase comprises 20-25 weight percent Cr, 30-50 weight percent Ni, and the remainders are Fe and Al.

BRIEF DESCRIPTION OF THE DRAWINGS

Various features and advantages of the present disclosure may be better understood by reading the following detailed description, taken together with the drawings wherein:

FIG. 2A illustrates a phase diagram for the coating composition Fe—XCr—YNi—ZAl, wherein X is 20-30 wt %, Y is 30-50 wt %, Z is 0 wt. %, the remainder Fe.

FIG. 2C illustrates a phase diagram for the coating composition Fe—XCr—YNi—ZAl, wherein X is 20-30 wt %, Y is 30-50 wt %, Z is 5.0 wt. %, the remainder Fe.

DETAILED DESCRIPTION

One limitation of Fe—Cr—Ni—Al coatings is that they may lack long-term oxidation resistance at elevated temperatures, which may be understood herein as 750° C. for 825 hours. In order to place the present disclosure in some perspective, experimental data was therefore initially generated and compared to a diffusion computation using a DICTRA, Version 25 software package for a baseline Fe—Cr—Ni—Al coating. The DICTRA software package utilized is currently available from Thermo-Calc Software AB, Stockholm, and provides simulated concentration profiles between a given alloy coating and a given substrate over a given time/temperature period.

Figure 1:
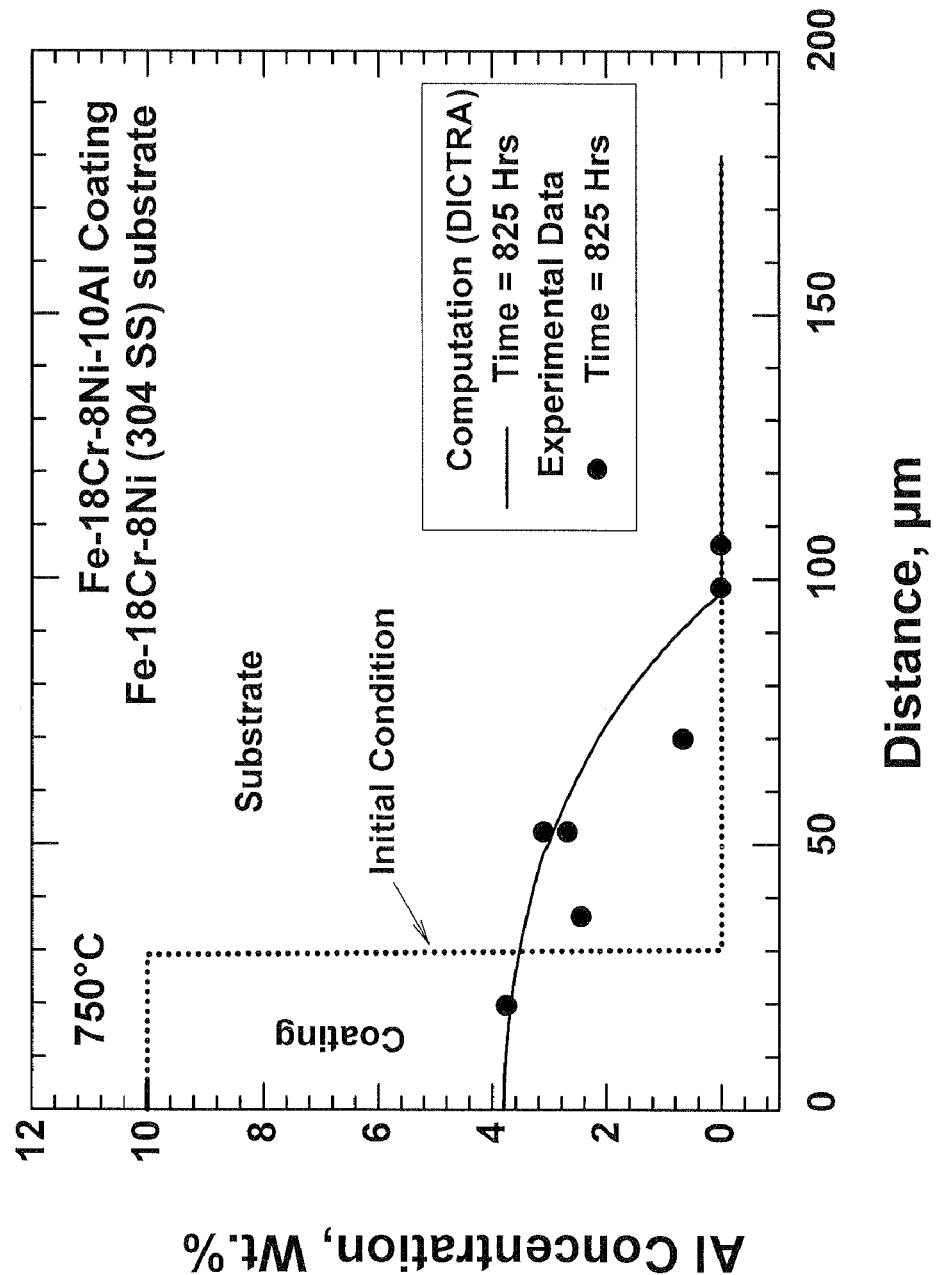
FIG. 1. illustrates the aluminum concentration in weight percent versus distance from the coating surface for the alloy Fe-18Cr-8Ni-10Al as applied to a substrate of Fe-18Cr-8Ni.

Attention is therefore directed to FIG. 1, which is directed at an alloy coating of Fe-18Cr-8Ni-10Al. The numbers before the respective elements correspond to the weight percent present in the coating. For example, the Fe-18Cr-8Ni-10Al alloy coating contains 18 weight percent Cr, 8 weight percent Ni, 10 weight percent aluminum, the remainder (64 wt. %) being Fe. The coating was then applied to a Fe-18Cr-8Ni substrate, which may be recognized as SAE type 304 stainless steel, and both experimental and computational diffusion characteristics were then evaluated for a time period of 825 hours at 750° C.

As illustrated in FIG. 1, the coating was 30 microns thick with an initial aluminum concentration at 10 weight percent. The DICTRA software analysis projected that after exposure to 750° C. for a period of 825 hours, the aluminum concentration in the coating would drop to a level of under 4.0 wt. % as a consequence of diffusing from the coating into the substrate. That is, as can be seen from the solid sloping line in FIG. 1, the DICTRA software projects that the aluminum will diffuse from the coating and into the substrate a distance from the coating surface of about 100 microns. The actual experimental data is also shown, and the data points similarly confirm that after exposure to 750° C. for a period of 825 hours, the aluminum appears to diffuse from the coating and into the substrate to a distance of about 100 microns from the coating surface, which represents about diffusion of up to about 70 microns into the substrate.

It may therefore now be appreciated that with respect to the situation present in FIG. 1, the Fe-18Cr-8Ni-10Al alloy does not have relatively good oxidation resistance, in the sense that the diffusion and loss of aluminum may restrict or eliminate the ability to form a continuous $Al_2O_3$ protective layer (i.e. a layer that prevents against oxidation). Accordingly, as may now be appreciated, it would be advantageous to identify those alloy concentrations and/or those conditions that may restrict or eliminate interdiffusion of the metal elements of a coating with a given substrate and thereby enhance the ability of the coating to remain protective, particularly after 750° C. for 825 hours.

The present disclosure therefore relates to coatings that may be described as having the following formula: Fe—XCr—YNi—ZAl, wherein X indicates a level of Cr of 20 weight percent to 30 weight percent, Y indicates a level of Ni of 30 weight percent to 50 weight percent and Z indicates a level of Al of 0 weight percent to 10 weight percent, wherein Fe accounts for the remainder. In addition, as will be discussed more fully below, such coating compositions may be configured to provide a selected type of diffusion resistant coating which may then restrict the diffusion of elements as between the coating and a given substrate.

Figure 7:
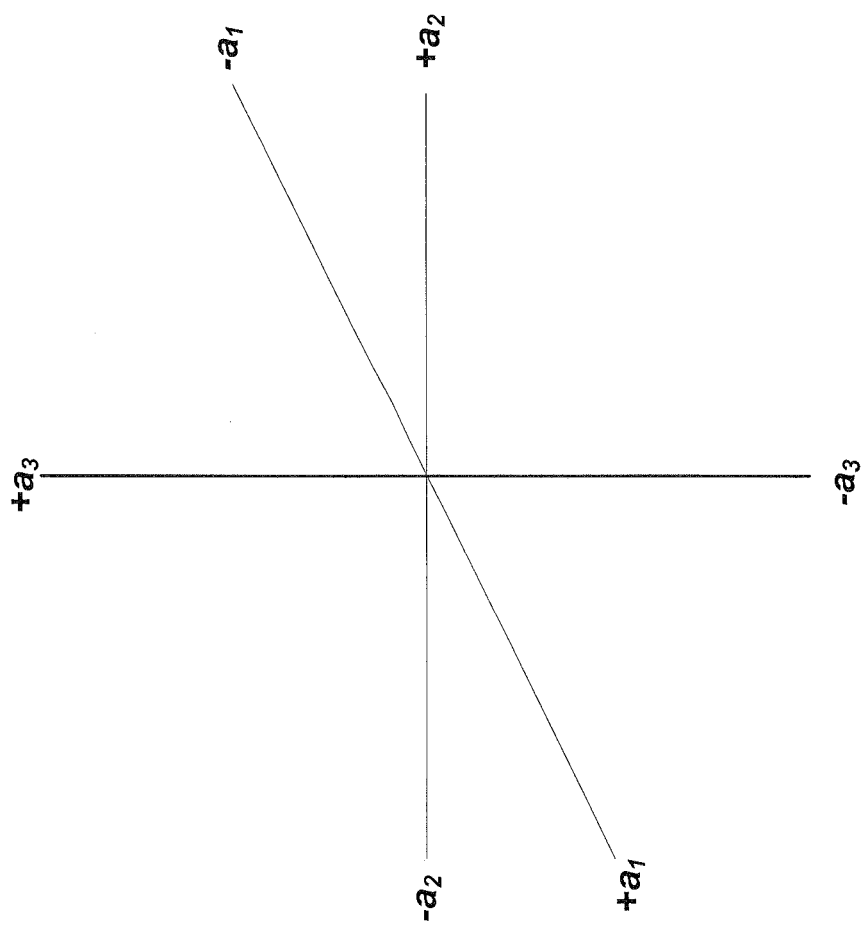
FIG. 7 illustrates a cubic unit cell and the locations of the indicated axis parameters, $+a_1$, $-a_1$, $+a_2$, $-a_2$, $+a_3$ and $-a_3$.

More specifically, the alloys may now be configured such that the diffusion resistant coating that is formed may be described as a diffusion barrier coating that may be greater than or equal to 90.0 mole percent of a face-centered cubic (fcc) or gamma ($\gamma$) phase. For example, 90.0 mole percent to 100 percent of a face-centered (fcc) or gamma ($\gamma$) phase. Such fcc phase may be characterized as again having a cubic unit cell in the Space Group Number 225 wherein the values of $a_1$ and $a_2$ are about 0.36 nm and the value of $a_3$ is also about 0.36 nm. Accordingly, the aforementioned values may vary ±0.05 nm. See FIG. 7. Reference herein to Space Group Numbers may be understood as reference to the feature that each space group has a unique number associated with it, and the Space Group Numbers by convention are number from 1 to 230 and are ordered according to the 7 crystal systems: triclinic, monoclinic, orthorhombic, tetragonal, trigonal, hexagonal and cubic.

The diffusion resistant coating may also contain up to about 10.0 mole percent of a body-centered cubic (bcc) or alpha ($\alpha$) phase. For example, 0.1 to 10.0 mole percent of a bcc or alpha phase may be formed. The $\alpha$-phase may be identified by a body-centered cubic unit cell in the Space group 229 wherein the values of $a_1$ and $a_2$ are about 0.29 nm and the value of $a_3$ is also about 0.29 nm. Accordingly, the aforementioned values may vary ±0.05 nm. See again, FIG. 7.

Figure 2B:
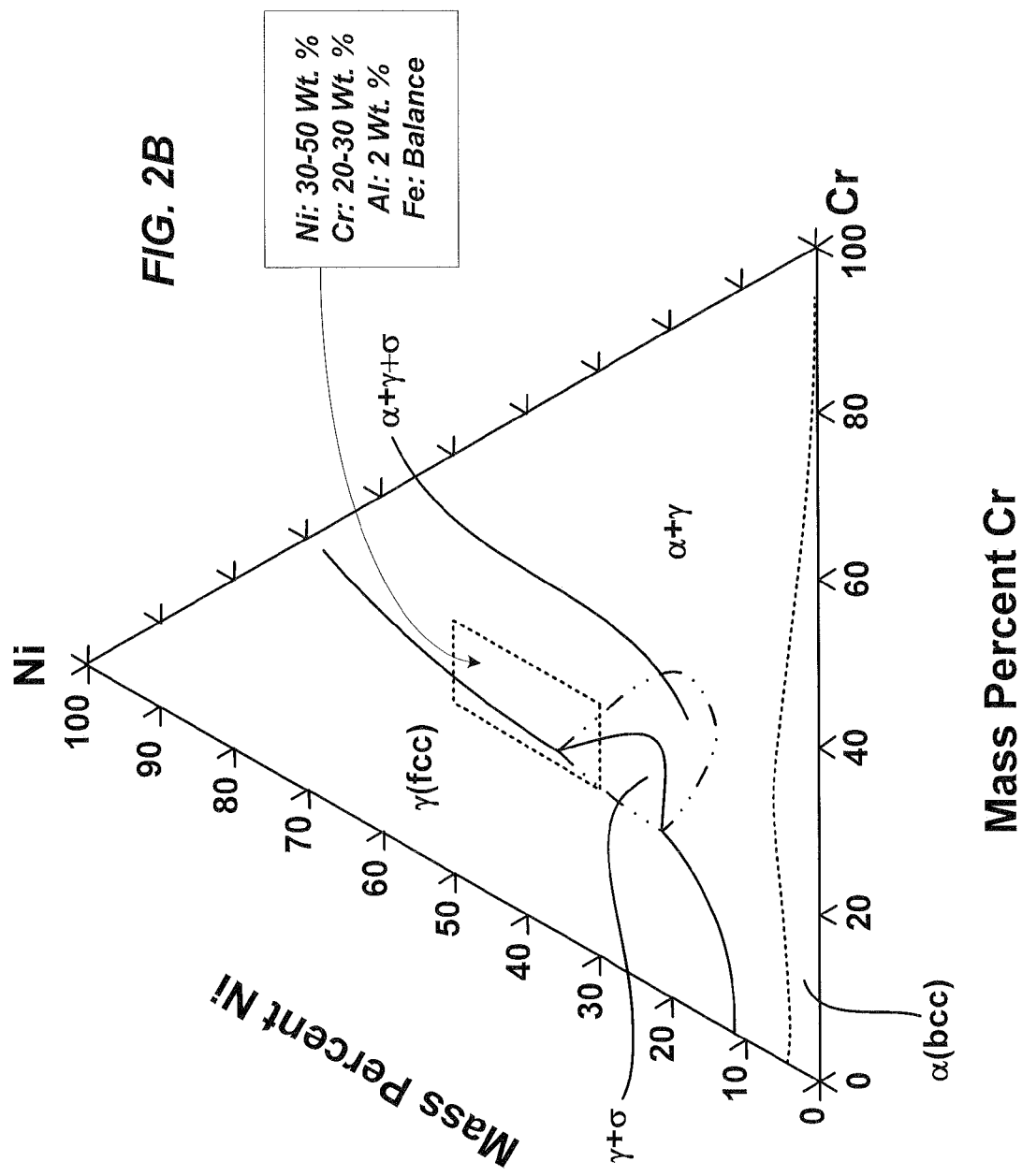
FIG. 2B illustrates a phase diagram for the coating composition Fe—XCr—YNi—ZAl, wherein X is 20-30 wt %, Y is 30-50 wt %, Z is 2.0 wt. %, the remainder Fe.

Attention is next directed to FIGS. 2A, 2B, 2C and 2D, which identify phase diagrams for the coating compositions for Fe—XCr—YNi—ZAl, wherein X again indicates a level of Cr of 20 weight percent to 30 weight percent and Y indicates a level of Ni of 30 weight percent to 50 weight percent. In FIG. 2A, Z is set to a level of Al of 0 weight percent, in FIG. 2B, Z is set to 2 weight percent aluminum, in FIG. 2C, Z is set to 5 weight percent aluminum, and in FIG. 2D, Z is set to a level of 10 weight percent aluminum. Accordingly, the ranges of X and Y for the relative weight percent of Cr and Ni can be seen in the rectangular-shaped parallelogram appearing at or near the center of each triangular-shaped diagram. In FIGS. 2A, 2B, 2C and 2D the coatings were observed to form 90.0 mole percent or more of a face-centered cubic (fcc) or gamma (γ) phase with up to about 10.0 mole percent of a body-centered cubic (bcc) or alpha (α) phase.

Example 1

Fe-25Cr-40Ni Coating on Fe-9Cr-1Mo

Figure 3:
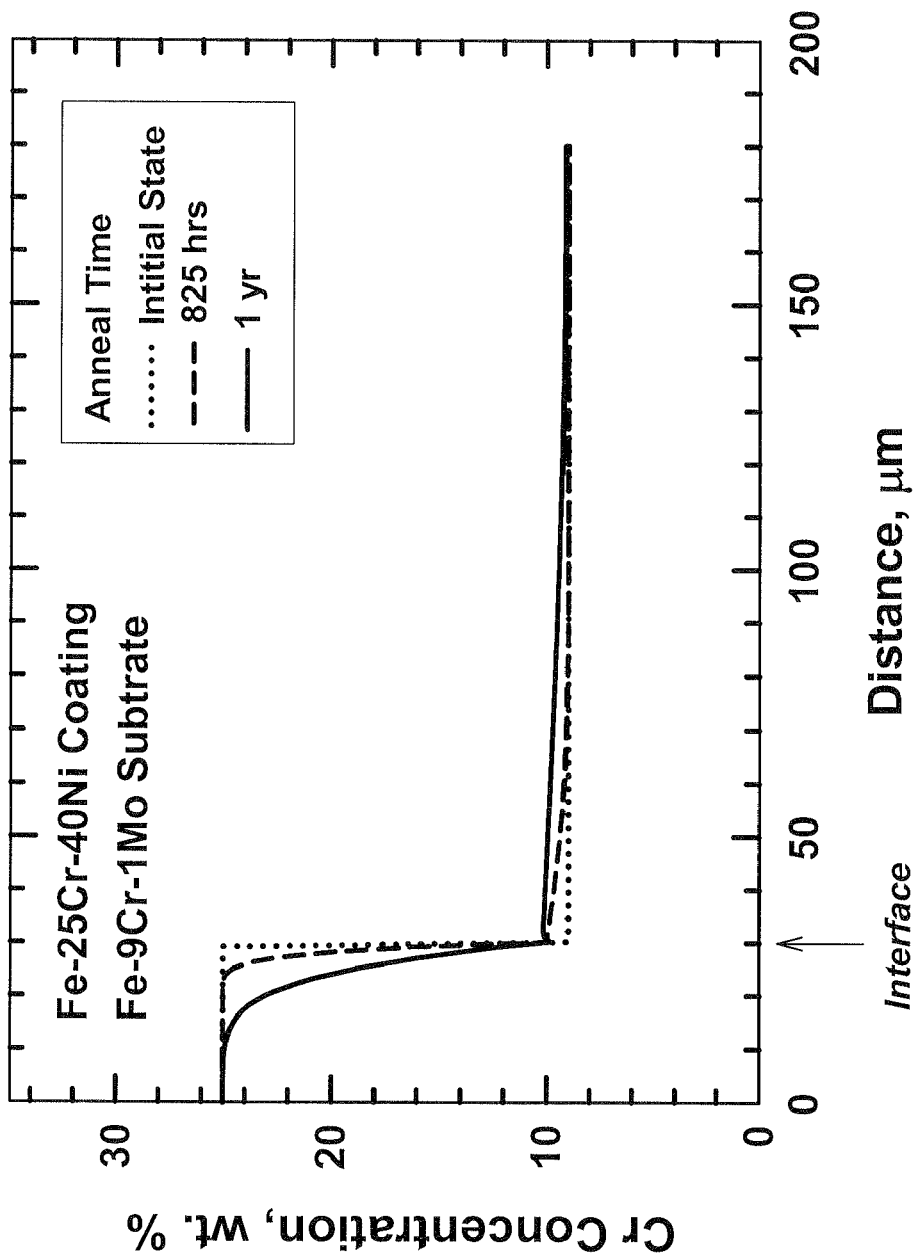
FIG. 3 illustrates the interdiffusion concentration profiles for a 30 micron thick Fe-25Cr-40Ni coating on a Fe-9Cr-1Mo substrate, with respect to the initial concentration of Cr in the coating and substrate, and the concentration profile for Cr after 825 hours and 1 year, at 750° C.

Interdiffusion of Cr, Ni, and Mo in Fe-25Cr-40Ni coating on Fe-9Cr-1Mo substrate at 750° C. were computed using the DICTRA Version 25 software package with a TCFE5 thermodynamic database and a MOB2 mobility database for exposure times of 825 and 8760 hours (1 year) at 750° C. TCFE5 is a collection of thermodynamic data such as free energy, enthalpy, and entropy of formation and MOB2 is a collection of diffusion data for steels and iron-based alloys. Both are products of Thermo-Calc Software AB, Stockholm. For this coating/substrate system, interdiffusion of Cr between the coating and the substrate and outward diffusion of Mo from the substrate to the coating are indicated to occur after 825 and 8760 hrs at 750° C. FIG. 3 shows the initial Cr concentration profiles, and as can be seen, initially, the Cr concentration is 25 wt. % and is present within the 30 micron coating and there is a relatively sharp drop to 9 wt. % Cr which is present in the substrate.

However, the Cr concentration distribution is indicated to change after 825 hours and 1 year at 750° C. as inter-diffusion occurs. As can be seen, for both the 825 hour situation and one year situation, the Cr concentration at the interface may decrease slowly due to Cr inter-diffusion from the coating into the substrate. As can be seen, for the 825 hour situation, the Cr concentration may be just above 20 weight percent near the interface and then fall to the level of 10 weight percent at the interface between the coating and the substrate. For the one year situation, the Cr concentration may again be just above 20 weight percent at a distance of 10 μm from the interface and then fall to about 10 percent by weight at interface. Both indicate slow inward diffusion of Cr from the coating into the substrate. Similarly, the inward diffusion of Ni from the coating to the substrate was also slow during the two exposure times. However, there was outward diffusion of Mo from the substrate into the coating. The corresponding phase field results indicated that the coating contained 100% fcc phase, while the substrate contained almost 100% bcc phase.

Figure 4:
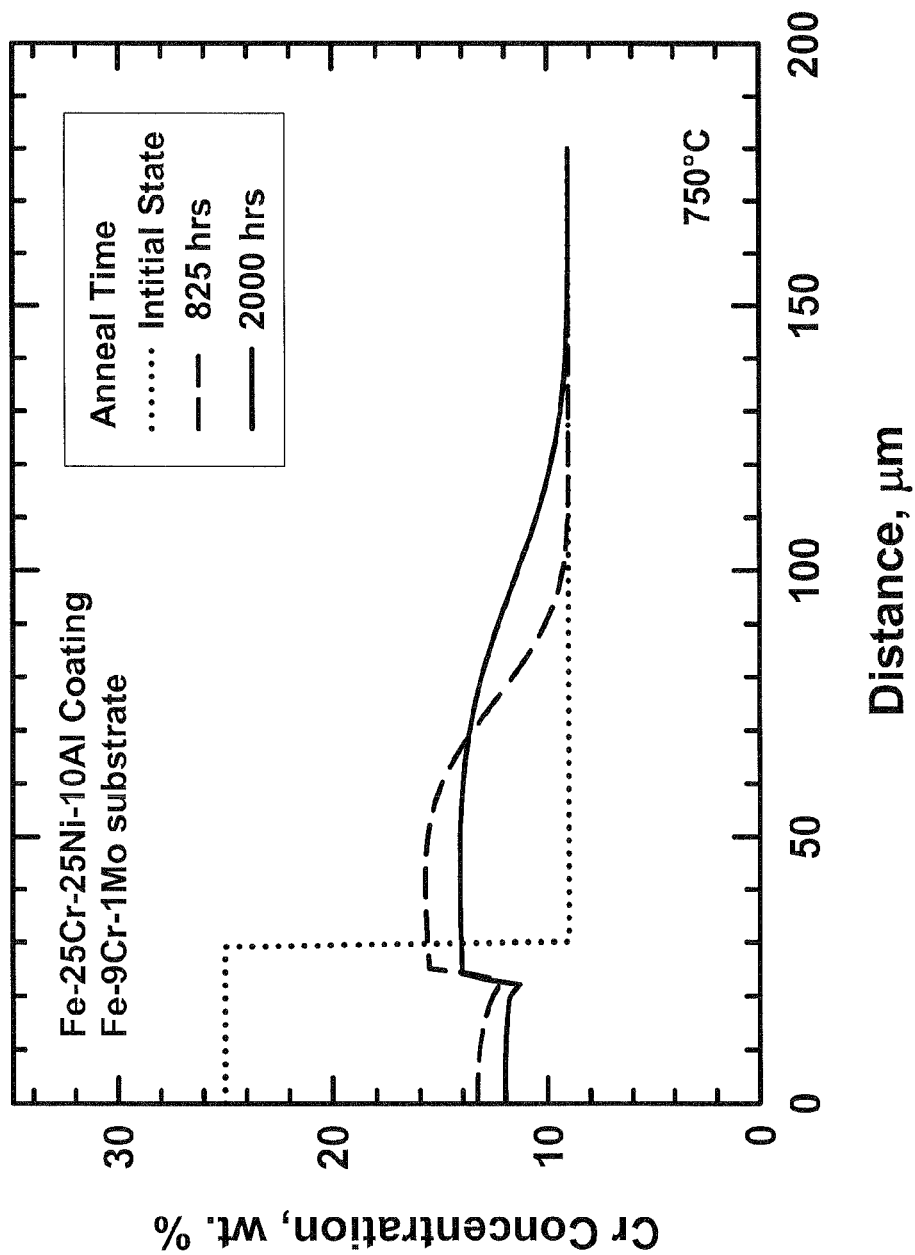
FIG. 4 illustrates the interdiffusion concentration profiles for a 30 micron thick Fe-25Cr-25Ni-10Al coating on a Fe-9Cr-1Mo substrate, with respect to the initial concentration of Cr in the coating and substrate, and the concentration profile for Cr after 825 hours and 2000 hours at 750° C.

The presence of 100% fcc phase in the coating appears to slow the inward diffusion of Cr into the substrate. For comparison, the interdiffusion profiles of Cr in Fe-25Cr-25Ni-10Al coating on Fe-9Cr-1Mo substrate in the absence of a 100% fcc phase is illustrated in FIG. 4. This particular coating contained about 52% bcc phase and 48% % fcc phase initially. With only 48% fcc phase in the coating, Cr diffuses from the coating and into the substrate after 825 hours and 2000 hours at 750° C. (see FIG. 4) and Mo diffuse from the substrate into the coating. As a result, the Cr concentration in the coating decreases rapidly with time, reducing its effectiveness against oxidation and corrosion.

Example 2

Fe-25Cr-40Ni-10Al coating on Fe-18Cr-8Ni (304 Stainless Steel)

Figure 5:
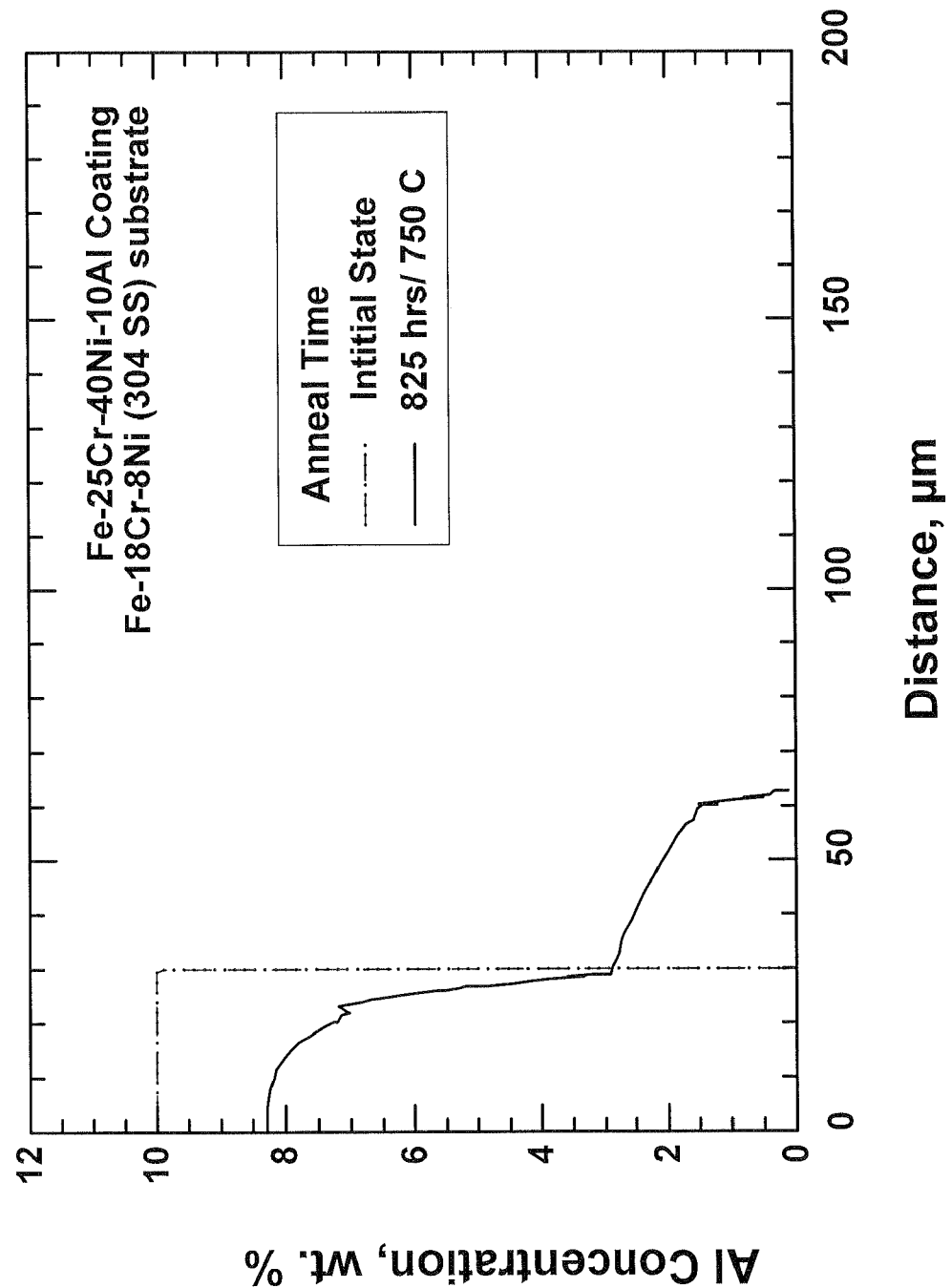
FIG. 5 illustrates the Al concentration profile after 825 hours at 750° C. for a 25Fe-25Cr-40Ni-10Al coating on a 74Fe-18Cr-8Ni (304SS) substrate.

Interdiffusion of Al, Cr, and Ni, in Fe-25Cr-40Ni-10Al coating on Fe-18Cr-8Ni (304 stainless steel) substrate at 750° C. were computed using the DICTRA software package for exposure times of 825 hours. For this coating/substrate system, there is some inward diffusion of Al into the substrate, but the rate of Al loss to the substrate is considerably lower compared to coatings with lower Cr and Ni contents. FIG. 5 shows the Al concentration profile after 825 hours at 750° C. The phase fraction result shown in FIG. 6 indicates that the coating initially contains 90 mole percent of fcc phase and 10 mole percent of bcc phase, while the substrate contains 100 mole percent of fcc phase. As aluminum diffuses from the coating into the substrate over time (FIG. 5), a layer of 100 percent fcc phase (mole fraction of 1) forms near the interface of the coating and the substrate, while the substrate opposite to the interface changes from 100 percent fcc phase to only 20 percent (mole fraction of 0.2) of fcc phase and 80 percent (mole fraction of 0.8) of bcc phase due to a local increase in the aluminum concentration. Since diffusion is more rapid in the bcc phase than in the fcc phase, this fcc layer as configured to form herein then acts as a diffusion barrier that limits the subsequent inward diffusion of Al and Cr into the substrate. By developing such barrier to inward diffusion, and, e.g., maintaining a relatively high Al content, this coating maintains good long-term corrosion resistance.

Figure 6:
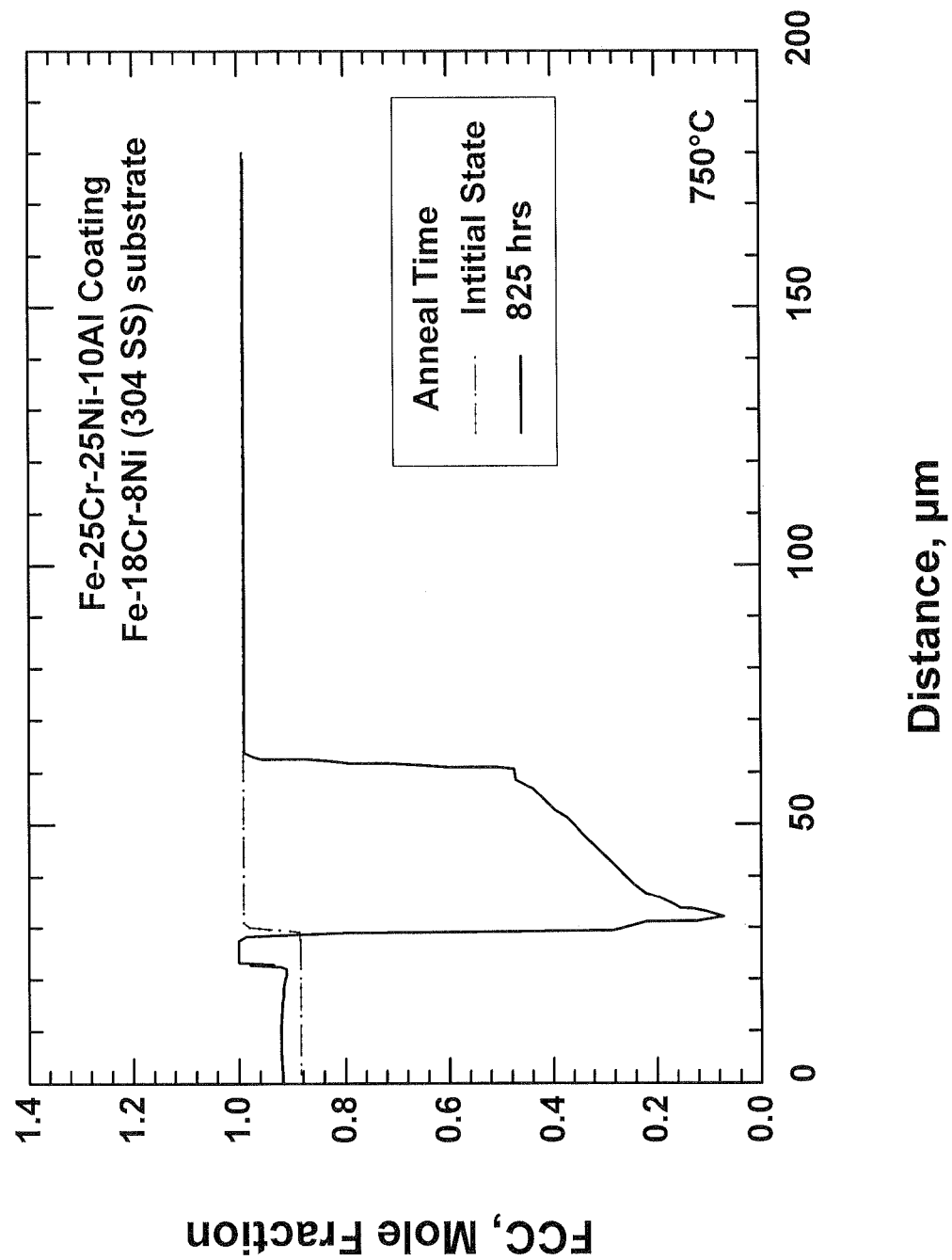
FIG. 6 indicates the mole fraction formation of the fcc layer at the coating/substrate interface for a 25Fe-25Cr-40Ni-10Al coating on a 74Fe-18Cr-8Ni (304SS) substrate.

More specifically, one may now compare the results in FIG. 5 with the results discussed earlier for FIG. 1. As can be seen from FIG. 5, the formation of the fcc layer at the interface of the coating and the substrate provides the situation where the inter-diffusion of Al with the substrate is reduced, relative to that situation where no fcc layer is formed. This can be seen upon comparison with FIG. 1, where it may again be appreciated that in the absence of formation of the fcc layer, after 825 hours at 750° C., the aluminum concentration in the coating drops to levels below 4.0 weight percent at the coating surface. The coating surface may be understood herein as the region form the surface to a thickness of 10 microns. By contrast, the level of Al at the coating surface, when the fcc layer is present, is much higher, and as shown in FIG. 5, the level of Al at the coating surface is certainly at or above 4.0 weight percent, and may be over 8.0 weight percent, while extending down at least 10 microns into the coating. At 20 microns into the coating the aluminum concentration is still about at least 7.0 weight percent, and at the coating/substrate interface, the aluminum concentration is about 2.5 weight percent to 3.5 weight percent. For the case shown in FIG. 5, the diffusion barrier layer has a thickness of about 6 microns measured from the interface of the coating and the substrate, as shown in FIG. 6.

It may now be appreciated that the compositions of corrosion-resistant coatings that form a diffusion barrier at the interface of the coating and substrate may be identified by selecting Fe—Cr—Ni—Al compositions that lie close to the fcc (γ) phase field and reside within a two-phase, three-phase or multiple phasefield. See again, FIGS. 2A-2D. For example, in the case of Fe—Cr—Ni—Al coatings with relatively low Al content (<2 wt. % Al), the coating compositions are highlighted in FIGS. 2A and 2B.

Figure 2D:
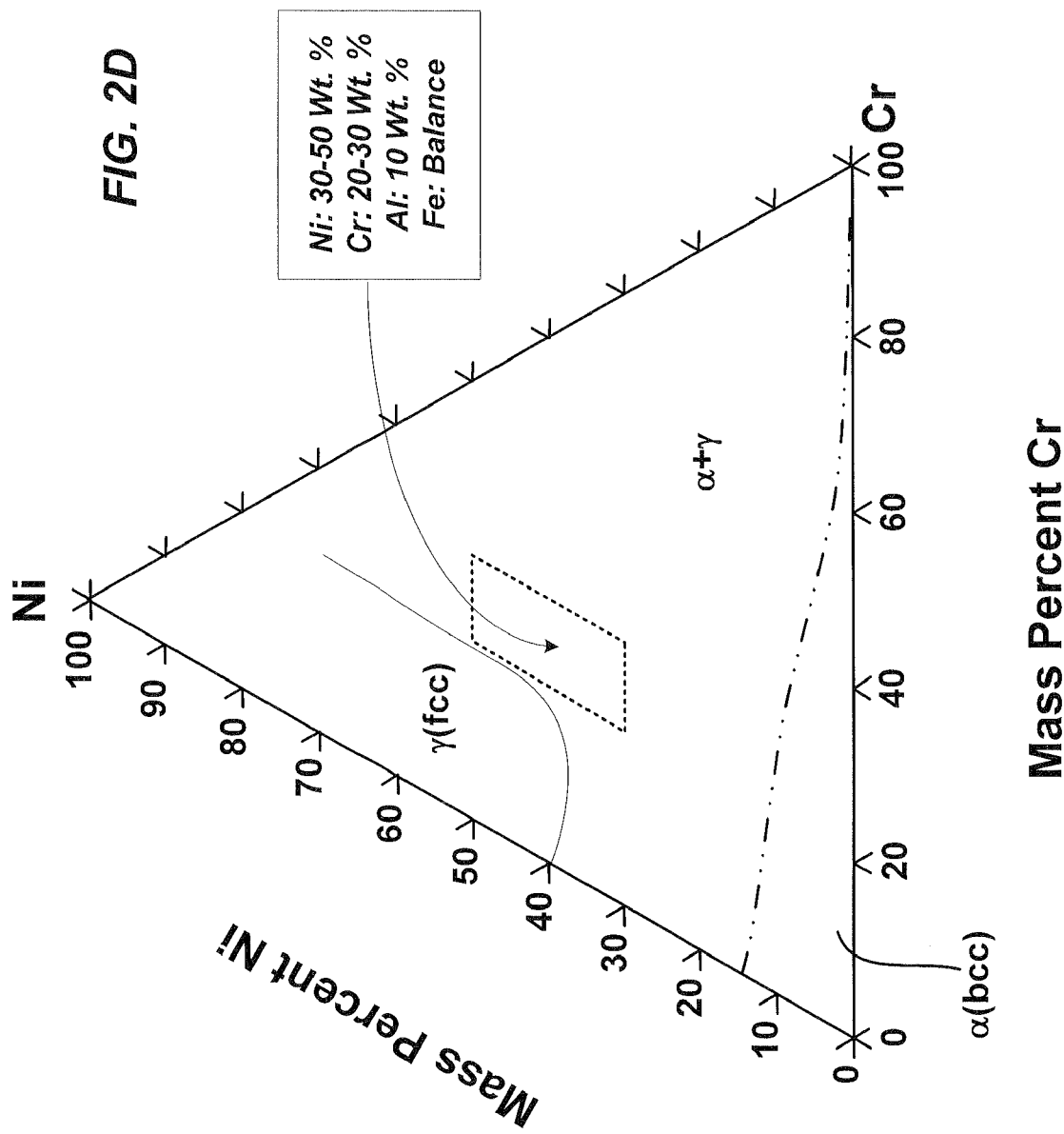
FIG. 2D a phase diagram for the coating composition Fe—XCr—YNi—ZAl, wherein X is 20-30 wt %, Y is 30-50 wt %, Z is 10.0 wt. %, the remainder Fe.

For Fe—Cr—Ni—Al coatings with high Al contents (>5 wt. % Al), the coating compositions are highlighted in FIGS. 2(C) and 2(D). These composition ranges lie within a two-phase α+γ field, where α is a bcc phase and γ is fcc phase, but lie next to the phase boundary for single-phase γ (fcc) field. As inter-diffusion of Al occurs between the coating and the substrate, the γ phase becomes the stable phase and forms at the interface of the coating and substrate. The composition of the γ phase then defines and maintains the Al content at the interface, thereby reducing the thermodynamic driving force for inter-diffusion of Al between the coating and the substrate.

The slower Al diffusivity in the fcc γ phase compared to the bcc ox phase further reduces the loss of Al from the coating to the substrate.

The new class of Fe—Cr—Ni—Al coatings disclosed herein can be fabricated or processed using conventional overlay, diffusion, or thermal spray techniques. Thermal spray techniques, including wire arc spray, plasma spray, high velocity oxygen fuel spray (HVOF), and detonation spray can be employed to deposit corrosion-resistant coatings based on Fe—Cr—Ni—Al. Of thermal spray techniques, wire arc spray and HVOF processes may produce reasonably dense and quality coatings that may be particularly suitable for boiler coating type applications.

Single or dual layer overlay coatings of the Fe—Cr—Ni—Al alloys may be applied using thermal spray and physical vapor deposition (PVD) processes. PVD methods are suitable for high performance parts such as turbine blades, vanes, and combustors. Diffusion coatings of the Fe—Cr—Ni—Al alloys may also be applied using the slurry and chemical vapor deposition (CVD) methods.

Figure 8:
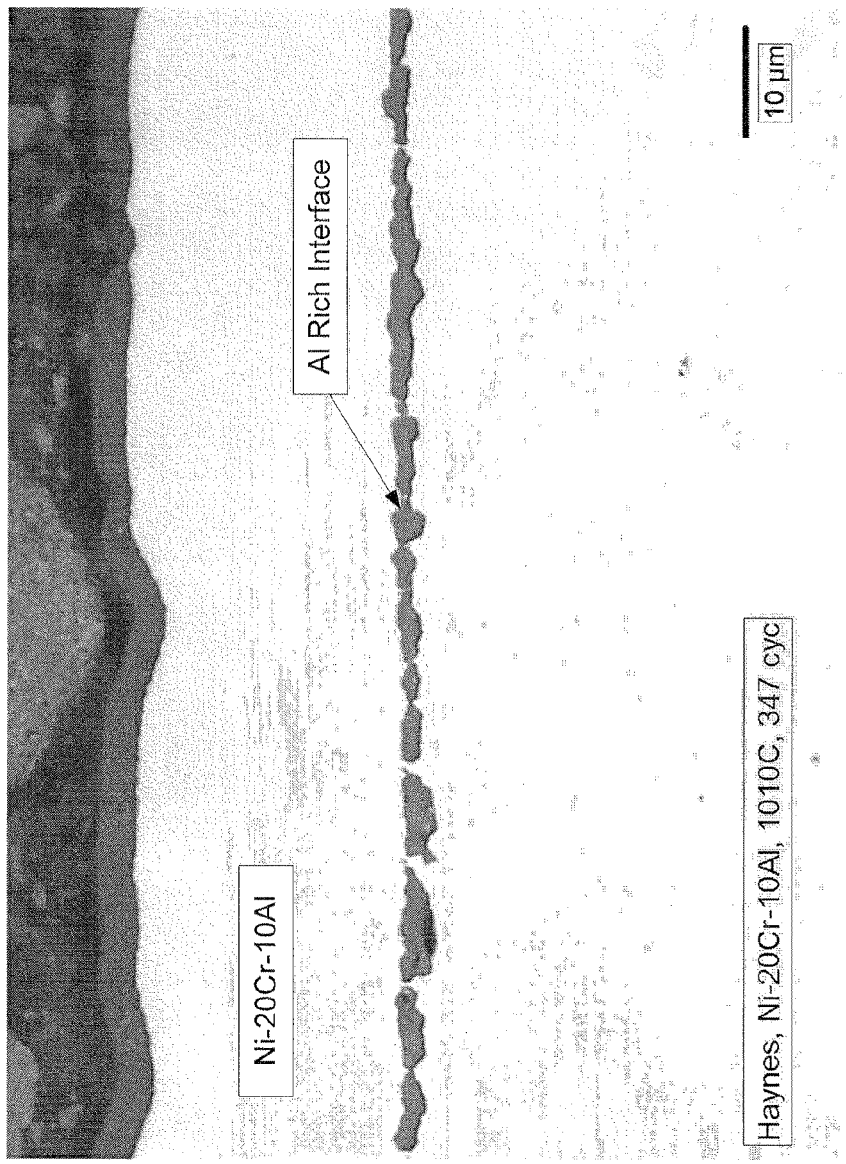
FIG. 8 illustrates, for comparison, the formation of a diffusion barrier coating from a coating of 70Ni-20Cr-10Al deposited on a substrate of Ni-22Cr-14.2W-1.3Mo-1.2Fe-0.4Al-0.5Mn-0.4Si.

For comparison, the formation of a diffusion barrier layer was next specifically observed at the interface of a Ni-20Cr-10Al coating (i.e., 70 weight percent Ni, 20 weight percent Cr and 10 weight percent Al) deposited on a Haynes 230 substrate (Ni-22Cr-14.2W-1.3Mo-1.2Fe-0.4Al-0.5Mn-0.4Si (numbers before the elements again indicating relative weight percent). As shown in FIG. 8, inward diffusion of Al resulted in the formation of a nearly continuously Al-rich layer containing about 80% Al at the coating/substrate interface after the coating was subjected to 347 one-hour thermal cycles between 25° C. and 1010° C. The corresponding Al content in the coating decreased from 10 wt. % to 1 wt. %, while the Al content in the substrate increased from 0.4 wt % to 1.0 wt %. Since the layer was Al-rich, the formation of the nearly continuous interface phase led to an undesirable loss of Al from this comparative nanocoating. Thus, the formation of a continuous diffusion barrier at the interface of a coating/substrate system by inter-diffusion is not always a straight-forward one and must be carefully considered. In general, as disclosed herein, it is useful to ensure that the formation of the interface barrier phase does not deplete the Cr or Al concentration in the coating. That is, as recognized herein, the levels of Cr or Al within the coating, when provided at a given weight percent, should not be reduced by more than 50% of such value, for the formation of the particular interface barrier.

It may now therefore be appreciated that the alloys and inter-diffusion coatings herein may have particular utility as applied to fossil fired power generating facilities, wherein fossil fuels may be employed. Fossil fuels may be understood as hydrocarbons, which range from volatile materials with low carbon/hydrogen ratios such as methane, to liquid petroleum to nonvolatile materials composed of almost pure carbon, like anthracite coal. In particular, the coatings herein may be applied to fossil-fired boilers and/or their associated components or surfaces to reduce maintenance costs and to provide for relatively more efficient operation. Fossil-fired boilers may be understood as generating steam which may then be utilized for energy production. This is underscored by the feature that relatively greater efficiency may be achieved in fossil-fired power plants by increasing, e.g., internal steam temperature and pressure to levels of 760° C. and 35 MPa, which coincide with the temperatures noted herein for formation of the above-referenced inter-diffusion barrier layers at the coating/substrate interface. Accordingly, as applied to a fossil-fired boiler surface, that is exposed to the burning of fossil, the coatings herein may improve the efficiency and longevity of such power-generating systems and improve, e.g., the efficiency of electricity production within a given power-plant operating facility.

What is claimed is:

1. A method of forming an inter-diffusion resistant matrix in an alloy coating positioned on a substrate comprising:
supplying a coating composition having the formula:

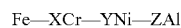

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent;
applying said coating composition to a substrate and heating the coating composition to form the matrix, wherein the heating forms a face-centered-cubic (fcc) phase identified by the presence of a cubic unit cell in Space Group 225, wherein the value of $a_1$ and $a_2$ is about 0.36 nm and the value of $a_3$ is also about 0.36 nm wherein the fcc phase comprises 20-25 weight percent Cr, 30-50 weight percent Ni, and the remainders are Fe and Al.

2. The method of claim 1 wherein said face-centered-cubic (fcc) phase is formed at a temperature of 750°.

3. The method of claim 1 wherein said coating comprises 90.0 mole percent or more of said face-centered-cubic (fcc) phase.

4. The method of claim 1 wherein said coating comprises up to 10 mole percent of a body-centered cubic (bcc) phase identified by the presence of a body-centered cubic unit cell in Space Group 229 wherein the values of $a_1$ and $a_2$ are about 0.29 nm and the value of $a_3$ is about 0.29 nm.

5. The method of claim 1 wherein said substrate is a surface within a fossil fired power generating boiler.

6. A method of forming an inter-diffusion barrier layer between an alloy coating positioned on a substrate comprising:
supplying a coating composition having the formula

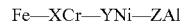

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent;
applying said coating composition to a substrate and heating the coating composition to form the barrier layer, wherein the heating forms a face-centered-cubic (fcc) phase identified by the presence of a cubic unit cell in Space Group 225 wherein the values of $a_1$ and $a_2$ are about 0.36 nm and the value of $a_3$ is also about 0.36 nm wherein the fcc phase comprises 20-25 weight percent Cr, 30-50 weight percent Ni, and the remainders are Fe and Al;
wherein said coating contains 90 mole percent or more of said fcc phase; and
wherein said coating includes up to 10 mole percent of a body-centered cubic (bcc) phase identified by the presence of a body-centered cubic unit cell in Space Group 229 wherein the values of $a_1$, $a_2$, and $a_3$ are about 0.29 nm.

7. A coating composition of a metallic alloy which forms a face-centered cubic (fcc) phase at the interface of said coating with a selected substrate, comprising:

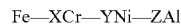

wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent;

said face-centered-cubic (fcc) phase identified by the presence of a cubic unit cell, wherein the values of $a_1$ and $a_2$ are about 0.36 nm and the value of $a_3$ is about 0.36 nm and wherein the fcc phase comprises 20-25 weight percent Cr, 30-50 weight percent Ni, and the remainders are Fe and Al.

8. The coating of claim 7, wherein the coating has a surface and the weight percent of Al at said coating surface and forming a face-centered cubic (γ) phase layer with a thickness of at least 5 microns at the interface in said coating and substrate.

9. The coating of claim 7 wherein said coating comprises 90.0 mole percent or more of said face-centered-cubic (fcc) phase.

10. The coating of claim 7 wherein said coating comprises up to 10 mole percent of a body-centered cubic (bcc) phase identified by the presence of a body-centered cubic unit cell in Space Group 229 wherein the value of $a_1$, $a_2$, and $a_3$ are about 0.29 nm.

11. The coating of claim 7 wherein said coating is on a substrate surface within a fossil fired power generating boiler.

12. A fossil fired power generating boiler, having a surface that is exposed to the burning of a fossil fuel wherein said surface includes a coating composition of a metallic alloy which forms a face-centered cubic (fcc) phase at the interface of said coating with a selected substrate, comprising:

Fe—XCr—YNi—ZAl wherein X has a value of 20-30 weight percent, Y has a value of 30-50 weight percent, Z has a value of 0-10 weight percent and Fe accounts for the remainder of the alloy composition, where the total X, Y, Z and the amount of Fe is 100 weight percent;

said face-centered-cubic (fcc) phase identified by the presence of a cubic unit cell, wherein the values of $a_1$ and $a_2$ are about 0.36 nm and the value of $a_3$ is about 0.36 nm and wherein the fcc phase comprises 20-25 weight percent Cr, 30-50 weight percent Ni, and the remainders are Fe and Al.

13. A fossil-fired generating boiler of claim 12 wherein the coating has a surface and the weight percent of Al at said coating surface and forming a face-centered cubic (y) phase layer with a thickness of at least 5 microns at the interface in said coating and substrate.

14. The fossil fired generating boiler of claim 12 wherein said coating comprises 90.0 mole percent or more of said face-centered-cubic (fcc) phase.

15. The fossil fired generating boiler of claim 12 wherein said coating comprises up to 10 mole percent of a body-centered cubic (bcc) phase identified by the presence of a body-centered cubic unit cell in Space Group 229 wherein the value of $a_1$, $a_2$, and $a_3$ are about 0.29 nm.

* * * * *